J. P. GROSVENOR.
Sawing Machine.
No. 77,606.
Patented May 5, 1868.
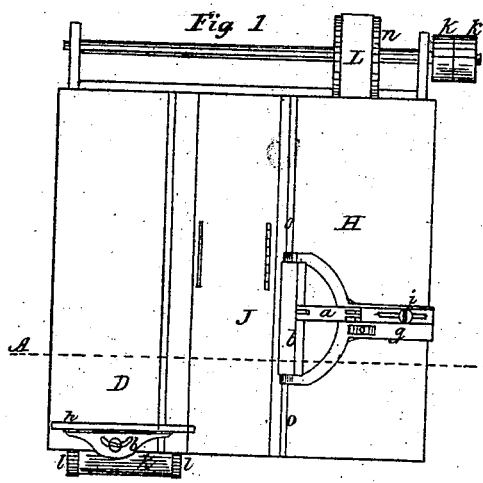
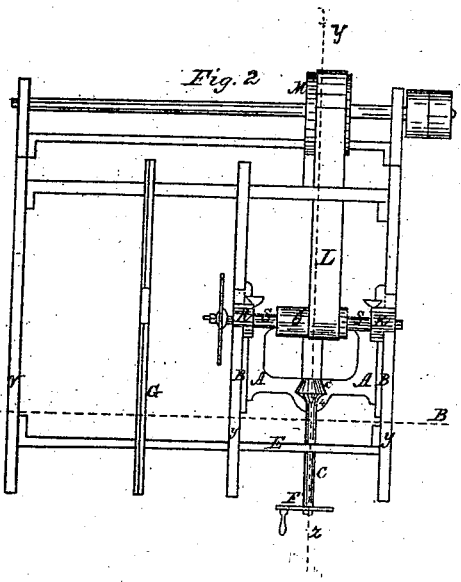
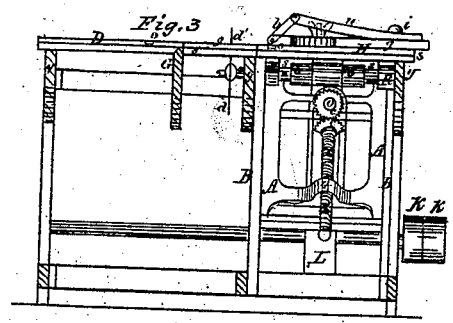
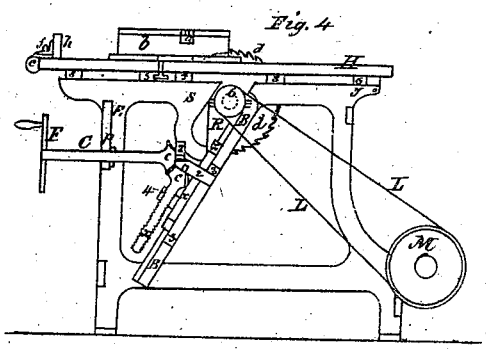
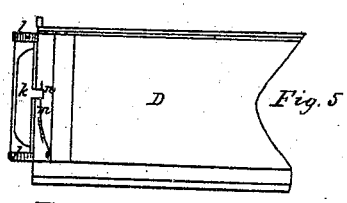
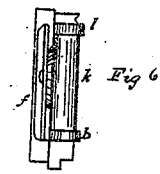
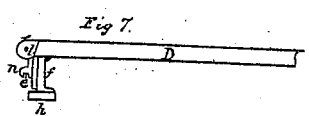
Witnesses
Stephen F. Gates
John E. Crane
Inventor
J. P. Grosvenor

United States Patent Office.

JONATHAN P. GROSVENOR, OF LOWELL, MASSACHUSETTS.

Letters Patent No. 77,606, dated May 5, 1868.

IMPROVEMENT IN SAWING-MACHINES.

The Schedule referred to in these Letters Patent and making part of the same.

TO ALL WHOM IT MAY CONCERN:

Be it known that I, JONATHAN P. GROSVENOR, of Lowell, in the county of Middlesex, and State of Massachusetts, have invented certain new and useful Improvement in Circular-Sawing Machines, of which the following is a full, clear, and exact description, reference being had to the accompanying drawings making part of this specification, in which—

Figure 1 is a plan or top view.

Figure 2, a top view after the saw-bench or table has been removed.

Figure 3, a longitudinal vertical section on the line A B of figs. 1 and 2.

Figure 4, a transverse vertical section on the line Y Z of fig. 2.

Figure 5 shows the under side of the sliding portion D of the saw-bench, with an adjustable reversible rest or gauge connected therewith.

Figure 6 is an end, and

Figure 7 an edge view of fig. 5, the gauge or rest in fig. 7 being reversed, or turned down to beneath the table.

This invention consists,

First, in the arrangement of the sliding box or journal-frame, A, between grooved guides, B, secured to the frame of the machine, and at an angle, as shown in fig. 4, in combination with the screw $x$, shaft C, and bevel-gears $c$, which move the frame A and the saw $d$ up or down the inclines.

Second. This invention consists in the employment of a connecting-rod, $a$, hinged or pivoted to the rocking-rest, $b$, and adjustably connected with the tail, $g$, of the rocking-rest frame, to move and retain said rest in a vertical or an inclined position, by means of a screw, $i$, passing through a slot in the connecting-rod into the tail $g$. The connecting-rod may be hinged or jointed at or near its centre, as shown in fig. 1.

Third. This invention consists in an adjustable reversible swinging rest, $h$, on the front of the portion D of the table, and so arranged on a semicircular slotted plate, $f$, and adjustably connected with a bar, $k$, pivoted to and between ears $l$, that said rest may be swung downward from a vertical position, as shown in fig. 4, to a position beneath the table, as shown in fig. 7, by releasing the spring $m$, shown in fig. 5, from the notch $e$, fig. 7, in the projection $n$ on the inner side of the bar $k$.

When the rest is wanted for holding the stuff to be sawed, it is swung upward on to the top of the table, and set or adjusted for sawing at a right angle, or at any other angle with the saw.

A similar rest may be used on the top of the table for sawing mitres, or other angles, by having a tongue fixed to the under side of the rest, to slide in either of the transverse grooves O in the top of the table. One end of the screw $x$, and one end of the shaft C, on which are the bevel-gears $c$, have their bearings in a stationary stand, 2, secured to girts or bars, 3, formed in one with or fastened to and between the guides B, back of the sliding-box frame A. The lower bearing of the screw $x$ is in the nut portion 4 of the bottom of the frame, so that turning the screw in one direction raises, and in the opposite direction lowers, the frame A and the saw, the object of which raising and lowering is to carry one saw downward to below the upper surface of the table, when another saw, arranged like that shown, and at the other end of the machine, is raised to perform some kind of sawing not so well performed by the lowered saw, one saw having teeth formed for splitting, and the other saw for cutting off lumber, but in all other respects the same, and the same devices for raising, lowering, and driving the saws.

The middle portion of the shaft C, by which the gears $c$ are turned, is supported in an ear or hanger, $p$, depending from girt E of the machine; and a wheel or a crank, F, provides for turning said shaft to raise or lower the frame A and the saw, the journal-boxes R of the saw-shaft S being arranged on or formed in one with the top of the frame A.

The sliding portion D of the saw-table has a groove in the under side, which fits on the V-shaped top edge of the transverse girt $g$, which guides the table in its transverse movements. Said portion D of the table is supported by and slides on a transverse girt, $v$, at or near the end of the machine. The pivoted or hinged portion H of the saw-table rests on girts $y$, and is hinged or pivoted to the rear ends of said girts, and may be raised in the usual way.

The middle portion I of the saw-table is movable, but is supported by longitudinal bars, $s$, secured to the under side of the portion H, and extending along under the portion I, which is halved or locked on to said bars to hold said portion I in position transversely.

The fast and loose pulleys, H, receive power and motion from a belt, running from a pulley on a rotating shaft, and the belt L, running from the pulley M to the pulley 6 on the saw-arbor, imparts rotary motion to the saw, or to any suitable moulding, grooving, or other tools or cutters arranged on the saw-arbor, in place of the saw.

I am aware that saws, supported in sliding frames, and adjusted by means of screws, operated by pulleys and bands on screw-shafts, and that cutter-heads in planing-machines have also been adjusted by screws in sliding frames, and operated by gear-wheels. Such arrangements I do not claim, as it would not accomplish what is desired in my circular-sawing machine, because my construction and operation of the sliding frame adjust the saw as to the height above the table, as well as to its relative distance from the axis of the driving-shaft, tending to keep the belt in the same strain upon the pulley. Nor do I claim as new any single device of itself; but What I do claim as new, and of my invention, and desire to secure by Letters Patent, is—

1. The frame A, carrying the saw-arbor S, sliding in the inclined guide-frame B, shaft C, screw $x$, and bevel-gear C C, all constructed and arranged to operate in the manner substantially as described.

2. The employment of the connecting-rod $a$, combined with the rocking-rest $b$, and the tail $g$ thereof, constructed and operating in the manner and for the purposes substantially as described.

3. The reversible rest $h$, combined with the pivoted bar $k$, projection $n$, notch $e$, slide-table D, spring $m$, or its equivalent, all constructed and operating substantially as described.

JONATHAN P. GROSVENOR.

Witnesses:
S. F. GATES,
JOHN E. CRANE.